Oct. 23, 1962  G. E. FRANCK  3,059,686
TUBE-WORKING TOOL
Filed Nov. 27, 1959  2 Sheets-Sheet 1
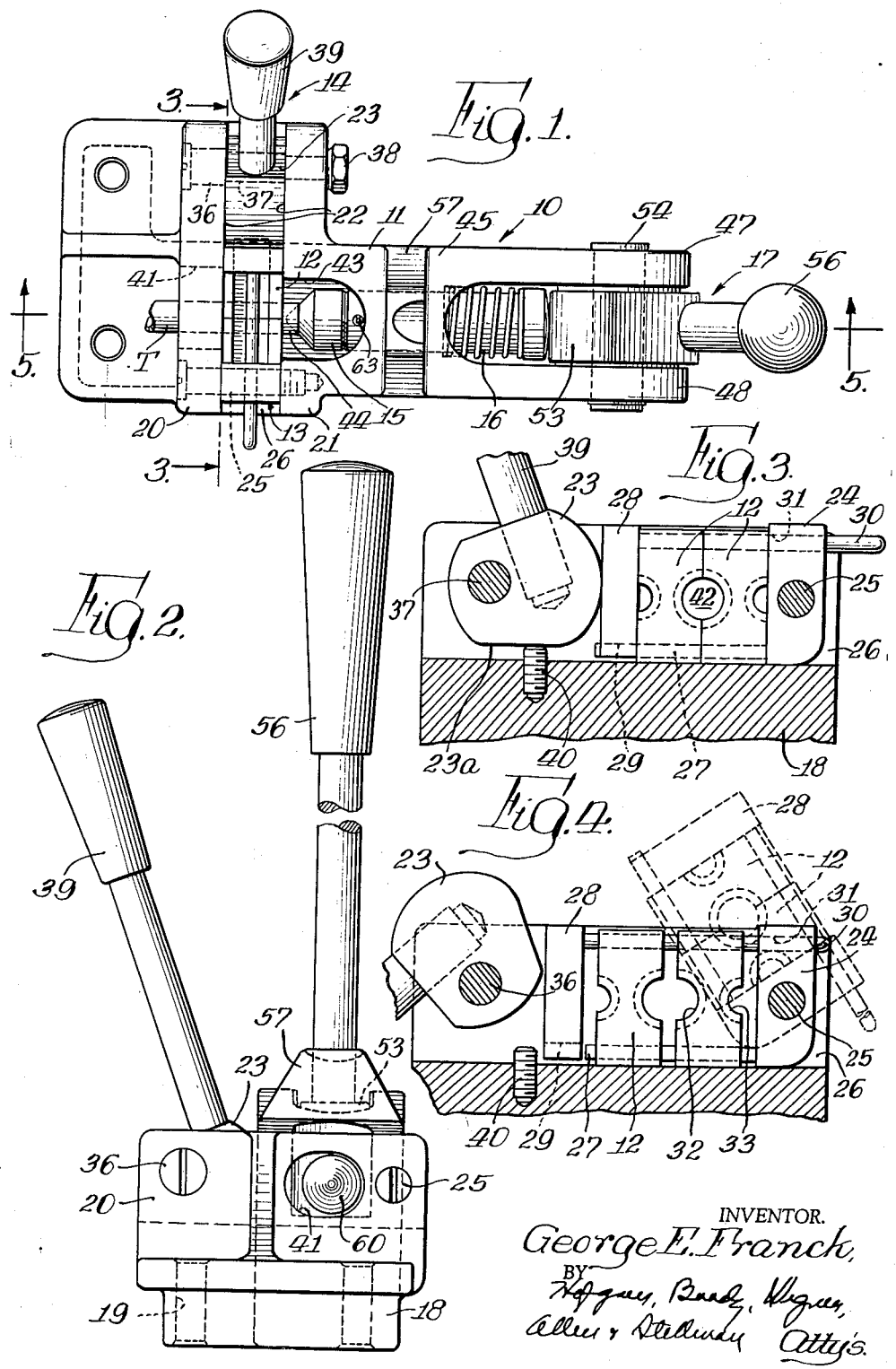
INVENTOR.
George E. Franck

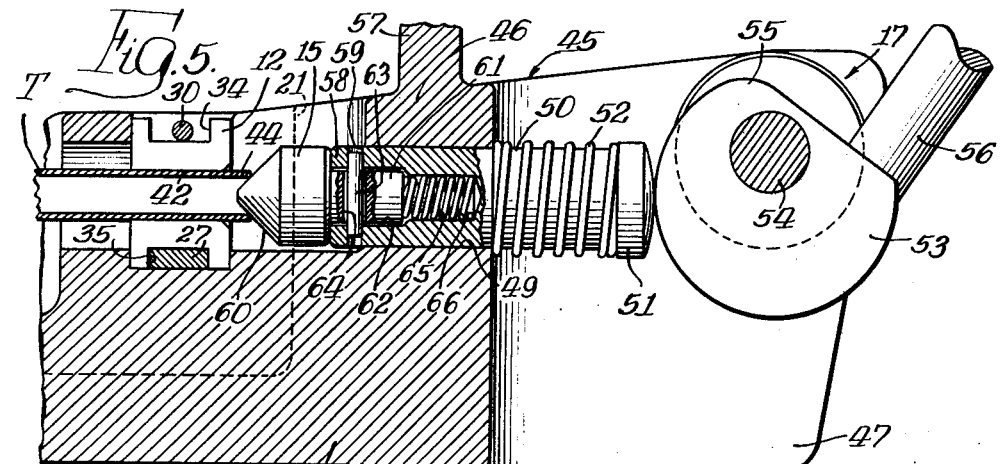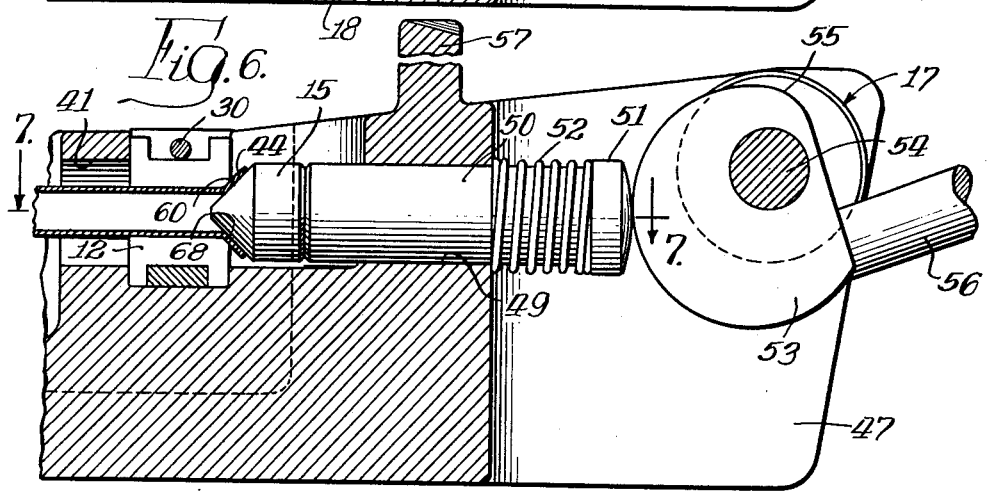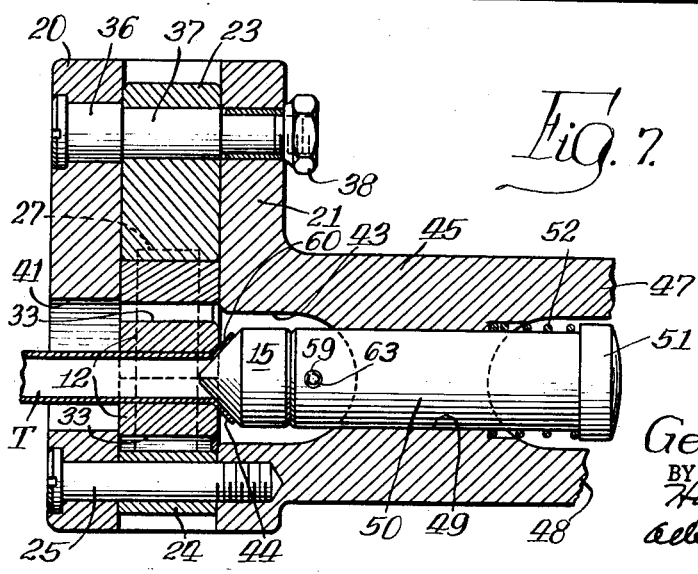

United States Patent Office 3,059,686
Patented Oct. 23, 1962

3,059,686
TUBE-WORKING TOOL
George E. Franck, Riverside, Ill., assignor to Imperial-Eastman Corporation, a corporation of Illinois
Filed Nov. 27, 1959, Ser. No. 855,639
6 Claims. (Cl. 153—79)

This invention relates to tube-working tools and in particular to cam-operated tube flaring or swaging tools.

One object of the instant invention is to provide a tube-working tool provided with new and improved tube clamping means.

Another object is to provide such a tool wherein the tube clamping means includes jaws carried in a guide pivotally secured to the body of the tool, permitting ready installation and removal of the jaws as desired.

A further object is to provide such a tool having new and improved adjustable means for effecting clamping engagement of the jaws with a tube end.

A still further object is to provide such a tool wherein the axis of pivoting of a cam effecting clamping engagement of the jaws is adjustably positionable.

Other features and advantages of the invention will be apparent from the following description taken in connection with the accompanying drawing wherein:

FIG. 1 is a plan of a flaring tool embodying the invention, a tube end to be flared being shown retained therein;

FIG. 2 is an end elevation of the flaring tool;

FIG. 3 is an enlarged fragmentary vertical section taken substantially along the line 3—3 of FIG. 1;

FIG. 4 is a section generally similar to that of FIG. 3 but with the elements in a tube released position, the tube clamping means being shown in dotted lines in a pivoted position permitting removal of the clamping jaws;

FIG. 5 is a fragmentary enlarged vertical section taken substantially along the line 5—5 of FIG. 1;

FIG. 6 is a section generally similar to that of FIG. 5 but with the elements arranged as upon completion of a flaring operation; and FIG. 7 is a fragmentary horizontal section taken substantially along the line 7—7 of FIG. 6.

In the exemplary embodiment of the invention, as disclosed in the drawing, a tube-working tool generally designated 10 comprises a body 11, a pair of tube clamping jaws 12 carried in a guide 13 pivotally mounted on the body 11, means generally designated 14 for urging the tube clamping jaws 12 to a tube clamping disposition, a tube-working means comprising a spreader 15 carried on a rod 16 for effecting a flare in a tube end T held in the jaws 12, and means generally designated 17 for effecting the forceful engagement of the spreader 15 with the tube end to effect the desired flare. Means 14 and 17 comprise cam devices permitting facilitated and rapid respective clamping of the tube end in the tool and flaring thereof.

More specifically, body 11 includes a base portion 18 having a pair of bolt receiving holes 19 for use in securing the flaring tool to a support element, such as a bench (not shown). Upstanding from base 18 is a pair of spaced walls 20 and 21 having confronting planar surfaces 22 between which are received guide 13 and a cylindrical cam 23 of jaw operating means 14. As best seen in FIGS. 3 and 4, guide 13 includes a first block 24 pivotally mounted on walls 20 and 21 by a pivot stud 25 carried by the walls and extending transversely across the space 26 between surfaces 22. At its lower end, block 24 is provided with a bar 27 extending adjacent base 18 longitudinally of space 26. Guide 13 further includes a second block 28 having a downwardly opening recess 29 slidably receiving bar 27, and a pin 30 secured to its upper end and extending longitudinally through space 26 to pass slidingly through a hole 31 in the upper portion of first block 24.

Jaws 12 comprise a pair of similar jaw elements each having a pair of oppositely opening semicylindrical recesses 32 and 33 having different diameters corresponding to different diameters of tubing to be flared. Each of the jaws is further provided with an upwardly opening rectangular recess 34 and a downwardly opening rectangular recess 35. The jaws are installed in guide 13 by pivoting the guide to the position shown in dotted lines in FIG. 4 and removing second block 28 together with pin 30. The jaws are arranged with the desired semicylindrical recesses confronting each other, herein recesses 32, and are installed in guide 13 by disposing them with bar 27 slidingly received in recesses 35. As seen in FIGS. 5 and 6, recesses 34 and 35 are displaced slightly to the left of the central plane of the jaws to assure proper installation in guide 13 so that the flare bevel 68 of the jaws will face the spreader 15. Second block 28 is then replaced in guide 13 with pin 30 extending through upper recesses 34 of the jaws and through hole 31 in the first block to prevent disassociation of the jaws from bar 27. The guide, with jaws 12 thusly mounted therein, is repivoted to the position shown in full lines in FIG. 4 whereupon the jaws are available for tube clamping functioning.

As discussed briefly above, the clamping of tube T in jaws 12 is effected by means 14. Cam 23 of means 14 is pivotally mounted on a stud 36 having a cylindrical portion 37 extending transversely across space 26 and eccentrically related to the axis of the stud. The stud is adjustably rotatable in walls 20 and 21 and is secured in the selected adjusted position by means of a nut 38 to secure cylindrical portion 37 in any one of a plurality of different positions longitudinally of space 26. The cam is rotated about the axis of stud portion 37 by a handle 39 between the full line position of FIG. 4 wherein the jaws 12 are loosely retained in guide 13 and the position of FIG. 3 wherein the cam urges the block 28 forcibly toward block 24 to urge the jaws 12 to the tube clamping position. In the jaw clamping position, a flat 23a on cam 23 abuts an adjustable stop 40 threadedly secured to base 18 to extend into space 26 for automatically limiting the movement of cam 23 to the most forceful clamping disposition. Any variation in the jaw dimensions longitudinally of space 26 is accommodated by the adjustment of the stud 37 to move the cam suitably toward or from block 28. As best seen in FIG. 1, the width of each of cam 23, guide 13, and jaws 12 is substantially equal to the spacing between surfaces 22, thereby maintaining the desired alignment of these elements in space 26 while permitting ready movement thereof through the space as desired.

The end of the tube T, which is to be flared in tool 10, is inserted through an elongated hole 41 in wall 20 to extend through the cylindrical tube clamping recess 42 defined by the confronting semicylindrical recesses 32 of the jaws 12 in the tube clamping disposition. Wall 21 is provided with a corresponding opening 43 into which the end 44 of the tube T projects. Extending laterally from wall 21 is an elongated body extension 45 having a connecting portion 46 and a pair of outer, spaced walls 47 and 48. A bore 49 is provided in connecting portion 46 generally coaxially of the tube clamping recess 42 defined by jaws 12. Extending slidably through bore 49 is a cylindrical rod 50 having a radially enlarged outer end 51 urged by a coil spring 52 extending between connecting portion 46 and end 51 against a segmentally cylindrical cam 53 of actuating means 17. Cam 53 is pivotally carried between walls 47 and 48 by means of a stud 54. As best seen in FIGS. 5 and 6, cam 53 is eccentrically mounted on stud 54 and is provided with a radius 55 which permits a smooth engagement of the cam with rod end 51 as the cam is turned in a clockwise direction to the position of FIG. 5. A handle 56 is provided for manually rotating the cam to urge the rod 50 inwardly (to the left as seen in FIG. 5) to the tube flaring position of FIG. 6. The width of cam 53 is slightly less than the spacing between walls 47 and 48 permitting free pivoting of cam 53 therebetween. A stop 57 upstanding from body portion 46 limits the counterclockwise (as seen in FIGS. 5 and 6) swinging of handle 56 to maintain it clear of the space adjacent the tube clamping jaws 12 thereby precluding interference by the handle with a tube clamping operation.

As best seen in FIG. 6, spreader 15 is carried on the inner end 58 of rod 50. The spreader is provided with a conical surface 60 which is urged into tube end 44 by the action of cam 53 on rod end 51 to effect the desired flare in the tube end. The spreader is further provided with a cylindrical support 61 extending coaxially oppositely to conical surface 60 and received in a cylindrical recess 62 in end 58 of the rod opening toward the tube clamping recess 42. The diameter of the cylindrical support is appreciably smaller than the diameter of recess 62 to permit transverse movement of the spreader into accurate alignment with tube end T held in the tube clamping jaws. Cylindrical support 61 is retained in recess 62 by means of a split cylindrical spring pin 63 secured to rod end 58 in a diametric bore 59 therein and extending transversely across recess 62 and through a bore 64 in support 61. The diameter of pin 63 is preferably appreciably smaller than the diameter of bore 64 to permit movement of the spreader axially of recess 62. The spreader is normally biased inwardly, toward the tube clamping recess 42, by means of a coil spring 65 received in a reduced diameter recess 66 opening coaxially into recess 62. Thus, prior to its engagement with tube end 44, spreader 15 is spaced outwardly from rod end 58 to facilitate any lateral translation thereof necessary to effect coaxial alignment with the tube end. This spacing, however, is relatively small being only that allowed by the clearance between pin 63 and the wall of bore 64 and is quickly taken up by the cam 53 upon slight further rotation thereof after the flaring surface 60 abuts tube end 44. Pin 63 may be removably secured to rod end 58 to permit substitution of spreaders as desired.

The operation of tube-working tool 10 is as follows. The tube end T is inserted into the tube clamping recess 42 defined by jaws 12, handle 39 being swung in the counterclockwise direction (as seen in FIG. 2) to the position wherein block 28 becomes sufficiently spaced from block 24 to permit separation of the jaws allowing insertion of the tube end into the tube clamping recess. The tube end is inserted through tube clamping recess 42 to project suitably into opening 43, as best seen in FIG. 5. Handle 39 is then manipulated in a clockwise direction to the position of FIG. 3 wherein the jaws 12 are forcibly juxtaposed in a tube clamping position. Because of the high mechanical advantage of cam 23, this tube clamping operation is quickly and facilely effected.

Handle 56 of the actuating means 17 is now urged in a clockwise direction (as seen in FIG. 5) to urge rod 50 and tube-working means 15 thereon (herein illustrated as a spreader) toward the tube clamping recess 42. When spreader surface 60 strikes the end 44 of tube T, the spreader is urged by the tube end laterally into a coaxial position to assure an accurately centered flare. As rod 50 is further advanced by cam 53, end 58 of the rod abuts the spreader and urges the spreader forcibly into the tube end to effect the desired flare, as seen in FIG. 6. As cam 53 provides a high mechanical advantage, the flaring of the tube end is quickly and facilely effected.

Upon completion of the flare, spreader 15 is retracted by a reverse movement of handle 56 to engage stop 57. Handle 39 is then swung in a counterclockwise direction (as seen in FIG. 2) to permit a sufficient separation of blocks 28 and 24 and, thus, jaws 12, permitting longitudinal withdrawal of the flared tube end outwardly through the jaws and hole 41.

The flaring tool is now ready for a subsequent flaring operation as discussed above. Thus, it may be seen that tube flaring tool 10 may be used for quickly and accurately flaring a plurality of similar size tubes, such as in a production line or shop operation. However, tube flaring tool 10 is also well adapted for flaring successively different size tubes, as the substitution of different jaw elements may be readily and facilely effected in guide 13.

While I have shown and described one embodiment of my invention, it is to be understood that it is capable of many modifications. Changes, therefore, in the construction and arrangement may be made without departing from the spirit and scope of the invention as defined in the appended claims.

I claim:
1. In a tube-working tool, tube clamping means comprising: a body; a guide unitarily pivotally mounted on the body and adapted to hold a pair of jaws forming a tube clamping recess when clamped together; and means on the body for clamping together the pair of jaws in said guide when the guide is in one pivotal position.

2. In a tube-working tool, tube clamping means comprising: a body; a guide unitarily pivotally mounted on the body and adapted to receive removably, when in one pivotal position, a pair of jaws forming a tube clamping recess when clamped together; and means on the body for clamping together the pair of jaws in said guide when the guide is in a second pivotal position.

3. In a tube-workin tool, tube clamping means comprising: a body; a guide unitarily pivotally mounted on the body and adapted to hold a pair of jaws forming a tube clamping recess when clamped together; means on the body for holding one of the jaws against movement away from a tube clamping position with the guide in one pivotal position; and a cam rotatable on the body to act against the other of the jaws for clamping a tube end in the pair of jaws in said guide.

4. The tool of claim 3 wherein the guide comprises a first block pivotally mounted on the body and having a hole and a bar projecting toward said cam, and a second block slidable on said bar and having a pin spaced from said bar and slidably engaging said hole to retain the pair of jaws between said blocks and between said bar and pin, said cam bearing against said second block to urge it forcibly toward the first block.

5. The tool of claim 3 including wall portions of the body for retaining the jaws against displacement transversely to the direction of action of the cam.

6. The tool of claim 3 wherein the axis of rotation of the cam is adjustably positionable in the direction of action thereof against said other of the jaws.

References Cited in the file of this patent
UNITED STATES PATENTS

| | | |
|---|---|---|
| 1,010,954 | Ramussen | Dec. 5, 1911 |
| 1,016,587 | Swartzlander | Feb. 6, 1912 |

(Other references on following page)

UNITED STATES PATENTS

| | | |
|---|---|---|
| 1,935,714 | Hummell | Nov. 21, 1933 |
| 2,117,543 | Corrigan | May 17, 1938 |
| 2,381,747 | Howe | Aug. 7, 1945 |
| 2,424,871 | Wenk | July 29, 1947 |
| 2,430,168 | Graham | Nov. 4, 1947 |
| 2,505,665 | Franck | Apr. 25, 1950 |
| 2,505,666 | Franck | Apr. 25, 1950 |
| 2,526,210 | Edelmann | Oct. 17, 1950 |
| 2,534,510 | Franck | Dec. 19, 1950 |
| 2,595,036 | Wolcott | Apr. 29, 1952 |
| 2,736,360 | Quercetti | Feb. 28, 1956 |
| 2,739,373 | Kane | Mar. 27, 1956 |
| 2,827,102 | Kay | Mar. 18, 1958 |

OTHER REFERENCES

The New Kwik-Flare, J. and J. Manufacturing and Sales Corp., 2491 Mission Street, San Marino, Calif., 4 pages.